US012183159B2

(12) United States Patent
Berman

(10) Patent No.: US 12,183,159 B2
(45) Date of Patent: Dec. 31, 2024

(54) GAMING DEVICES AND METHODS FOR ENHANCING GAME INDICIA IN RANDOM INCREMENTS

(71) Applicant: KING SHOW GAMES, INC., Minnetonka, MN (US)

(72) Inventor: Bradley Berman, Minnetonka, MN (US)

( * ) Notice: Subject to any disclaimer, the term of this patent is extended or adjusted under 35 U.S.C. 154(b) by 207 days.

(21) Appl. No.: 17/892,881

(22) Filed: Aug. 22, 2022

(65) Prior Publication Data

US 2022/0406139 A1 Dec. 22, 2022

Related U.S. Application Data

(63) Continuation of application No. 16/683,877, filed on Nov. 14, 2019, now Pat. No. 11,423,741.

(60) Provisional application No. 62/767,573, filed on Nov. 15, 2018.

(51) Int. Cl.
*A63F 13/00* (2014.01)
*G07F 17/32* (2006.01)

(52) U.S. Cl.
CPC ...... *G07F 17/3262* (2013.01); *G07F 17/3211* (2013.01); *G07F 17/3293* (2013.01)

(58) Field of Classification Search
CPC ............. G07F 17/3267; G07F 17/3211; G07F 17/3293; G07F 17/3288; G07F 17/3272
See application file for complete search history.

(56) References Cited

U.S. PATENT DOCUMENTS

| | | | |
|---|---|---|---|
| 10,332,335 B2 | 6/2019 | Halvorson et al. | |
| 2004/0266512 A1 | 12/2004 | Kaminkow | |
| 2008/0167118 A1* | 7/2008 | Kroeckel | G07F 17/3293 463/31 |
| 2011/0034234 A1 | 2/2011 | Berman et al. | |
| 2011/0092262 A1* | 4/2011 | Naicker | G07F 17/32 463/13 |
| 2013/0178274 A1 | 7/2013 | Lucchesi et al. | |
| 2014/0080586 A1 | 3/2014 | Walker et al. | |
| 2014/0335931 A1 | 11/2014 | Kemper | |
| 2016/0086429 A1 | 3/2016 | Inamura et al. | |
| 2017/0018142 A1* | 1/2017 | Gold | G07F 17/3267 |

OTHER PUBLICATIONS

IGT, "Wild Pirates", NPL printed from internet Mar. 4, 2020.

* cited by examiner

*Primary Examiner* — David L Lewis
*Assistant Examiner* — Eric M Thomas

(57) ABSTRACT

Systems, apparatuses and methods for enhancing poker cards in subsequent poker games that are randomly incremented thereto, such as through advancements toward a threshold from a random initial value. One embodiment involves poker cards that are enhanced when reaching a random increment of poker games played relative to a triggering event, such as through expiration of a random count value. An initial count value or other tracking measure is established and displayed to the player, and when that count/tracking reaches a threshold, the card having the expired counter and/or cards in a vicinity of the card having the expired counter are enhanced, such as by converting those cards to Wild cards.

20 Claims, 11 Drawing Sheets

GAMING DEVICES AND METHODS FOR ENHANCING GAME INDICIA IN RANDOM INCREMENTS

RELATED APPLICATIONS

This application is a continuation of U.S. application Ser. No. 16/683,877, filed Nov. 14, 2019, now U.S. Pat. No. 11,423,741, which claims the benefit of Provisional Patent Application No. 62/767,573, filed on Nov. 15, 2018, pursuant to 35 U.S.C. § 119(e), both of which are incorporated herein by reference in their entirety.

FIELD

This disclosure relates generally to games, and more particularly to gaming systems, apparatuses/devices and methods for enhancing game play items in random increments, such as through advancements toward a threshold from a random initial value.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to enhance game play items in random increments, such as through advancements toward a threshold from a random initial value.

In one embodiment, poker cards are enhanced in random increments, such as through expiration of a random count value. A count or other tracking measure is initiated randomly, and in some embodiments with a random initial value, and when that count/tracking reaches a threshold, the card having the expired counter, as well as cards in a vicinity of the card having the expired counter, are enhanced, such as by converting those cards to Wild cards or other cards possibly beneficial to the player.

In another embodiment, a gaming apparatus is provided for facilitating player participation in poker games. The gaming apparatus includes a display, a user interface configured to receive player input to facilitate player participation in the poker game, a wager input device structured to identify and validate player assets and to permit the player to participate in the poker games in which the player assets are provided, and a processor. In this embodiment, the processor is configured to randomly select cards to present in a first poker game, randomly designate a card position of one of the randomly selected and presented cards of the first poker game, establish a count value in connection with the random designation of the card position, and facilitate the player's participation and completion of the first poker game. The processor is further configured to advance the count value towards a threshold each time another poker game is played. When a particular poker game is reached where the count value reaches the threshold, the processor provides an enhanced card in the particular poker game at a location based on the randomly designated card position identified in the first poker game, and facilitates the player's completion of the particular poker game using the enhanced card.

In more particular embodiments of such a gaming apparatus, the processor is configured to provide the enhanced card in the particular poker game at the randomly designated card position identified in the first poker game. In another embodiment, the processor is configured to provide the enhanced card in the particular poker game at card positions adjacent to the randomly designated card position identified in the first poker game. In another embodiment, the processor is configured to provide the enhanced card in the particular poker game at card positions occupied by randomly-occurring indicia in the particular poker game. In a more particular embodiment, the randomly-occurring indicia includes additional randomly designated card positions having associated established count values. In another embodiment, the processor is configured to provide the enhanced card in the particular poker game at card positions occupied by randomly-occurring indicia in the particular one of the poker games and adjacent to the randomly designated card position identified in the first poker game. In still another embodiment, the processor is configured to provide the enhanced card in the particular one of the poker games at card positions occupied by dealt cards having certain card characteristics.

In one embodiment of such a gaming apparatus, the poker games are or at least include single-hand poker games, where in other embodiments the poker games are or at least include multi-hand poker games that allow concurrent play of multiple poker hands. In a more particular embodiment, the multi-hand poker games involve multi-play poker games where the held cards for one of the poker hands are replicated into the remaining poker hands, and the cards that were not held or replicated are discarded in favor of replacement cards.

Multiple indications and associated counters may be implemented. In one embodiment, the processor is configured to randomly designate a second card position of one of the randomly selected cards of any of the poker games played, establish a second count value in connection with the random designation of the second card position, facilitate the player's completion of the poker game in which the second card position was randomly designated, advance the second count value towards a second threshold each time another of the poker games is played. In such an embodiment, when a second particular one of the poker games is reached where the second count value reaches the second threshold, the processor provides a second enhanced card in the second particular one of the poker games at the randomly designated second card position identified in the poker game in which the second card position was randomly designated. The processor further facilitates the player's completion of the second particular one of the poker games using the second enhanced card. The processor is configured to continue to be able to randomly designate still additional card positions and associated count values to provide additional enhanced card opportunities.

In one particular embodiment of such a gaming apparatus, the enhanced card, the second enhanced card, and the Nth enhanced card are the same. In another embodiment, the enhanced card, the second enhanced card, and the Nth enhanced card are Wild cards. In still another embodiment, one or more of the enhanced card, the second enhanced card, and the Nth enhanced card are different from one another.

In another particular embodiment of such a gaming apparatus, any of the randomly designated card position, the randomly designated second card position, up to some randomly designated Nth card position for their respective poker games may be at a same card position or at different card positions.

In accordance with another embodiment, a gaming apparatus is provided for facilitating player participation in electronic poker games. The gaming apparatus includes a display, a user interface configured to receive player input to facilitate player participation in the poker game, a wager input device structured to identify and validate player assets and to permit the player to participate in the poker games in which the player assets are provided, and a processor. In this embodiment, the processor is configured to randomly select cards to present in a first multi-hand poker game where multiple poker hands are concurrently played, and display those randomly selected cards. The processor is configured to randomly designate zero, one or more card positions of the plurality of poker hands of the first multi-hand poker game. If any of the card positions of the poker hands of the first multi-hand poker game was randomly selected, then the processor assigns count values to those card positions, advances the count values towards a threshold on each of the multi-hand poker games played, and determines when any of the count values reach the threshold. When any of the count values reach the threshold, the processor is configured to provide an enhanced card at a location based on the randomly designated card position of the first multi-hand poker game, and to facilitate completion of the multi-hand poker game in which the count value reached the threshold using the enhanced card.

In a more particular embodiment of such a gaming apparatus, the processor is configured to assign the count values by randomly selecting one of the count values from a plurality of available count values. In another embodiment, the processor is configured to assign the count values by assigning a fixed count value. In yet another embodiment, the processor is configured to advance the count values towards their respective thresholds by a count of one on each of the multi-hand poker games played.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
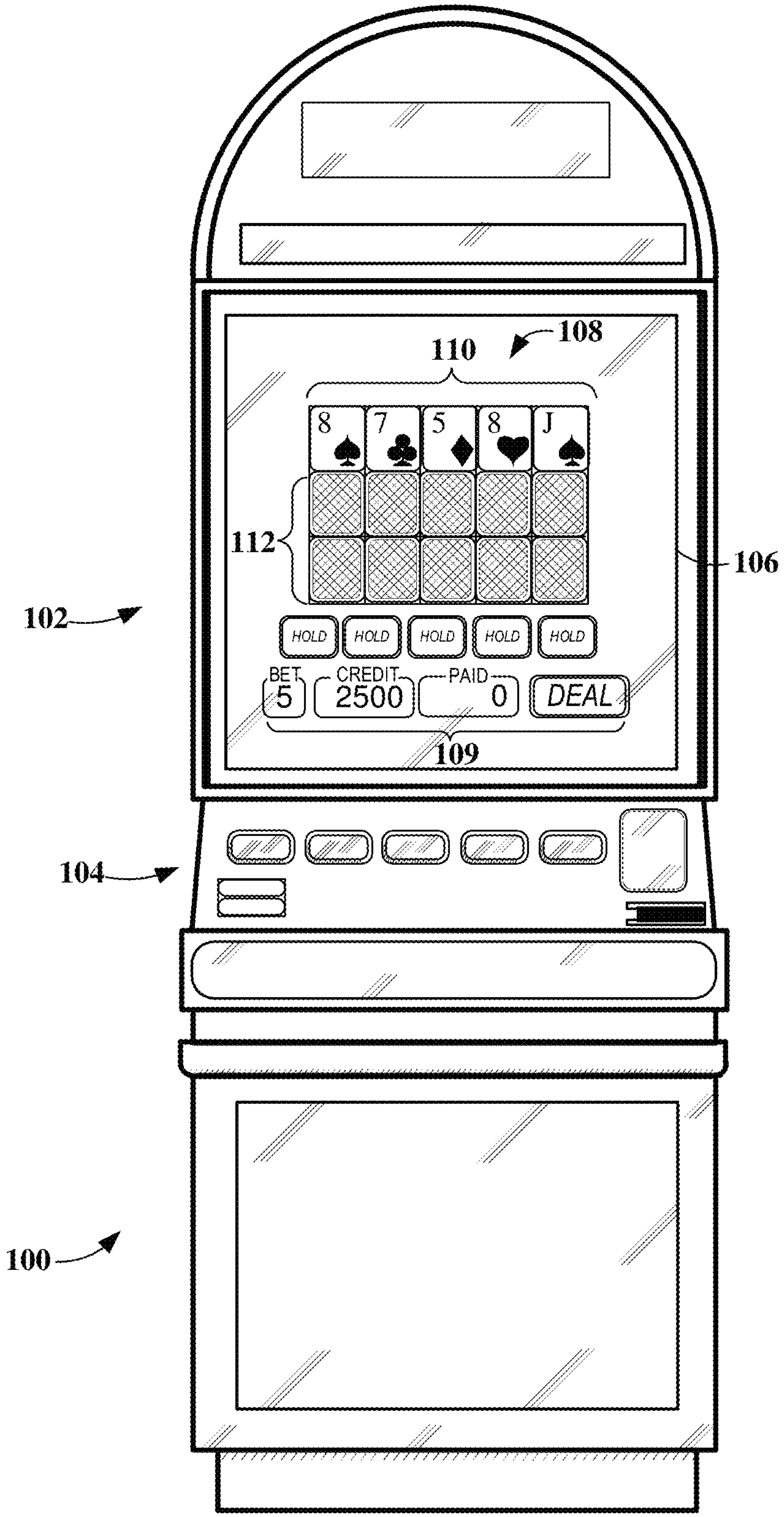
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatuses.

In various embodiments, the gaming displays are described in conjunction with the use of data in the form of "symbols." In the context of this disclosure, a "symbol" may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are disclosed for improving or otherwise enhancing one or more game play items among multiple game play items, in response to a triggering event that initiates a tracked advancement over a plurality of gaming events toward reaching a threshold, that upon reaching, improves or otherwise enhances particular game play items. For example, in the context of a video poker game, one or more cards may be enhanced in response to a maintained counter appearing with a card(s), and when the counter advances (e.g., decrements) toward a threshold (e.g., zero), the cards having some characteristic are provided as or converted to cards favorable to the player. In some embodiments, the enhanced cards are more favorable and/or more versatile than those that would have otherwise been presented at those card locations. In another embodiment, what is "favorable" to the player may be at least equal to the card otherwise provided to the player, such as a Wild card replacing a Wild card, or an Ace replacing an Ace, etc.

The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. poker, such as video poker) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that involves enhancing cards or other game play items on subsequent hands/gaming events as a result of an advancement towards and ultimate reaching of a threshold. The advancement may occur on a hand-by-hand basis in one embodiment, such that in the case of a counter, the counter advances towards its threshold on each new deal of the cards (i.e. each played card/hand event).

In one embodiment, the gaming activity comprises a card game, which may involve a single hand of cards or multiple hands of cards. The cards serve as the indicia that enables games to be conducted, through interaction of the card indicia. Cards in a current gaming activity may be associated with some indicia highlighting a count value, or just a count value alone, identifying a number of events (e.g., card hands) to be played before an identified card and potentially others meeting some criteria (e.g., proximity criteria relative to the identified card) will be enhanced.

These principles may be applied in a poker context, regardless of the type of poker game. The poker game may involve stud poker variations, draw poker variations, community card poker variations, any combination thereof, or any other wagering game utilizing cards. In one embodiment, one or more cards of a hand(s) in a single or multiple hand game may be randomly or systematically marked, and cards that are dealt to those marked positions in a subsequent hand(s) are benefitted or upgraded in some way, such as changing to a higher value, changing to a card more likely to result in a winning combination (e.g., wild card) and/or higher payout (e.g., multiplier or other payout modifier), etc.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve video poker embodiments, other embodiments include application of these inventive techniques in other types of slot games, poker games, roulette, bingo, or other games of chance. Some of these other types of embodiments will be discussed below as variations to the examples illustrated.

In one embodiment, poker cards are enhanced in random increments, such as through expiration of a random count value. A count or other tracking measure is initiated randomly, and in some embodiments with a random initial value, and when that count/tracking reaches a threshold, the card having the expired counter, as well as cards in a vicinity of the card having the expired counter, are enhanced, such as by converting those cards to Wild cards or other cards possibly beneficial to the player.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve electronic/video poker examples of this concept, other embodiments include application of these inventive techniques in of slot games, other card games, roulette, bingo, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as "displays" or "gaming displays") that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some embodiments described herein, the primary gaming portion 108 may display a grid(s) or equivalent arrangement(s) of playing cards 110 forming one or more hands or other sets of cards in a card game, such as a poker game. In the illustrated example, a set of five playing cards 110 forms a video poker hand, which represents a portion of a game play event. For example, if the game play event is a video draw poker game, the gaming device 100 may deal five cards, allow the user to select cards to hold, deal replacements for the cards not held, and determine a payout based on the final cards in the hand. The illustration and description of five-card draw poker is for purposes of example and not of limitation, as the disclosure is applicable to numerous other card games, such as stud poker or hold'em poker, as well as other types of gaming activities and apparatuses, such as slot machines, dice, coins, etc. For example, some embodiments may relate to slot games, where the primary gaming portion 108 presents a grid (or equivalent arrangement) of symbols or other game elements in respective symbol locations (not shown), where the symbols or combinations of symbols determine gaming outcomes.

In some embodiments, the primary gaming portion 108 may also display one or more additional hands 112 of playing cards, such as in a multi-play poker embodiment. For example, one multi-play poker embodiment involves draw poker, where at least one hand 110 is dealt, and cards held by the player in hand 110 are replicated into one or more other hands 112, whereby all hands 110, 112 may then be completed with replacement cards while having one or more commonly held cards. Multi-play embodiments may also be played without holding any cards, and/or without replication of held cards into other hands. In some embodiments, other hands 112 may represent discrete, individually-played additional hands of cards that are unrelated to the play of other hands 110.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards to hold and/or selection of individual cards to discard and replace (e.g., in a draw poker embodiment), which subset of cards of a larger set of cards to hold/use for a final hand(s) (e.g., in some stud poker embodiments), wagering inputs, etc. The game display 106 of the display area 102 may include other features that are not shown, such as pay tables, navigation controls, etc.

Figure 2:
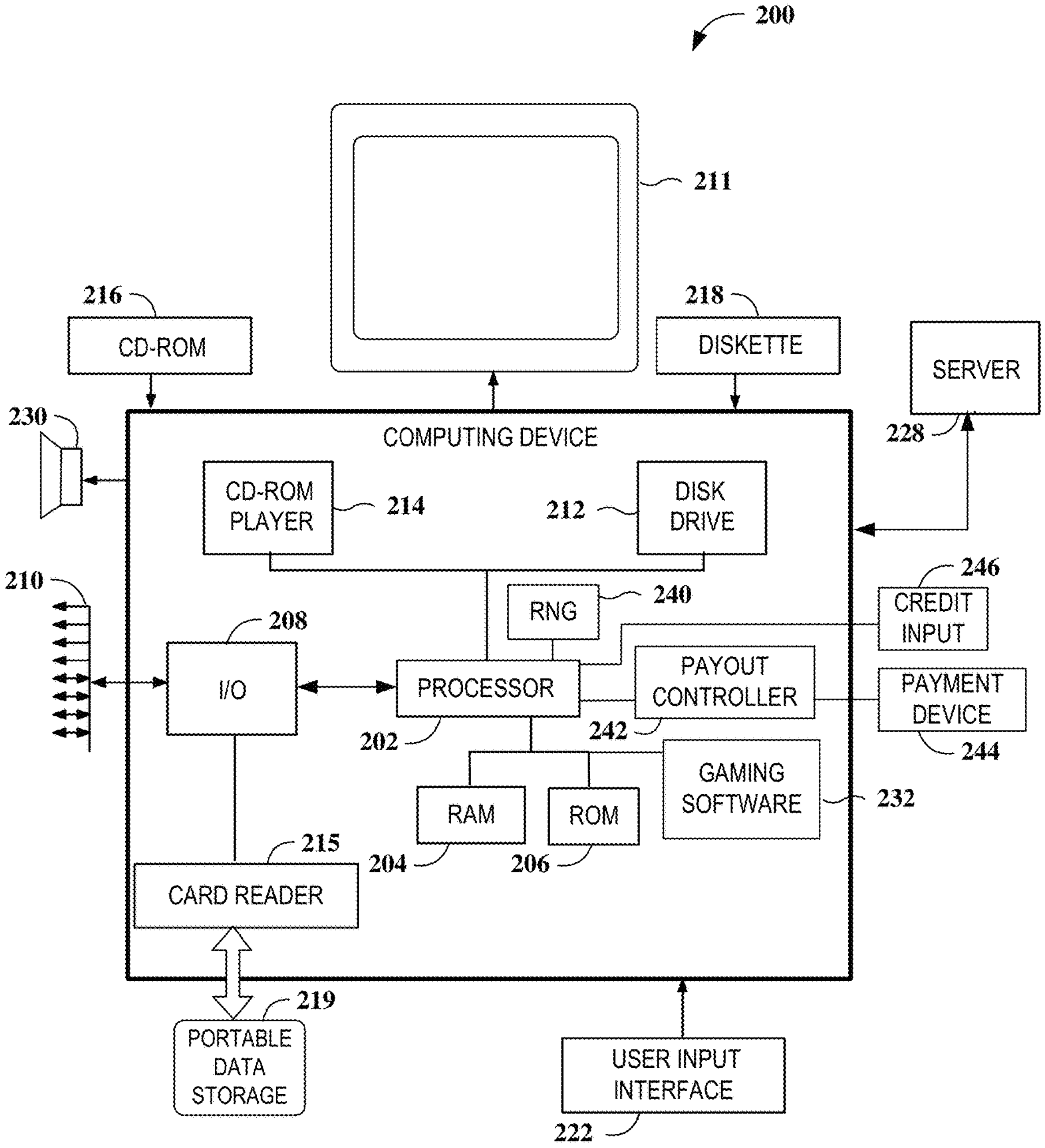
FIG. 2 is a block diagram illustrating a representative computing arrangement capable of implementing games and features in accordance with the invention and representative embodiments described herein.

Although FIG. 1 illustrates a particular implementation of some of the embodiments in a casino or electronic gaming machine ("EGM"), one or more devices may be programmed to play various embodiments of the disclosure. The concepts and embodiments described herein may be implemented, as shown in FIG. 1, as an electronic/video gaming machine or other special purpose gaming kiosk, or may be implemented via computing systems operating under the direction of local gaming software, and/or remotely-provided software such as provided by an application service provider (ASP). Such gaming machines may also utilize computing systems to control and manage the gaming activity, although these computing systems typically include specialized components and/or functionality to operate the particular elements of electronic gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions described herein includes a processor(s), such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display, or an electronic/video display such as liquid crystal displays, plasma displays, cathode ray tubes (CRT), digital light processing (DLP) displays, liquid crystal on silicon (LCOS) displays, etc., or any type of known display or presentation screen. Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in, for example, one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described herein. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaming devices can support gaming features as described herein. In one embodiment, processor-based software modules are configured to enhance game play items in random increments, such as through advancements toward a threshold from a random initial value. For example, processor-based software modules may cause a display to present cards, such as poker hands. The poker cards may be enhanced in random increments, such as through expiration of a random count value. A count or other tracking measure is initiated randomly, and in some embodiments with a random initial value, and when that count/tracking reaches a threshold, the card having the expired counter, as well as cards in a vicinity of the card having the expired counter, are enhanced, such as by converting those cards to Wild cards or other cards possibly beneficial to the player.

Providing such potential player benefits provides numerous improvements over prior art electronic poker and other gaming activities capable of consecutive game event playing. For example, it provides an incentive for players to continue playing future games, as rewards not associated with the player's current game are held in abeyance until, for example, an identified count of future games has been played. Among other things, this provides a heightened anticipation for players on a "greater than game-to-game" basis. Increasing anticipation also creates greater enjoyment for players, as well as addresses the game operator's ability to hold players' attention. These and other benefits provide improvements over other prior art poker and similar games.

Many embodiments may be described in terms of an electronic poker game, where presented cards potentially form a result(s) that conforms to a predetermined winning outcome to determine payout awards. However, the principles described herein are equally applicable to other games of chance, as described herein and as will be readily apparent to those skilled in the art from the teachings herein.

Figure 3:
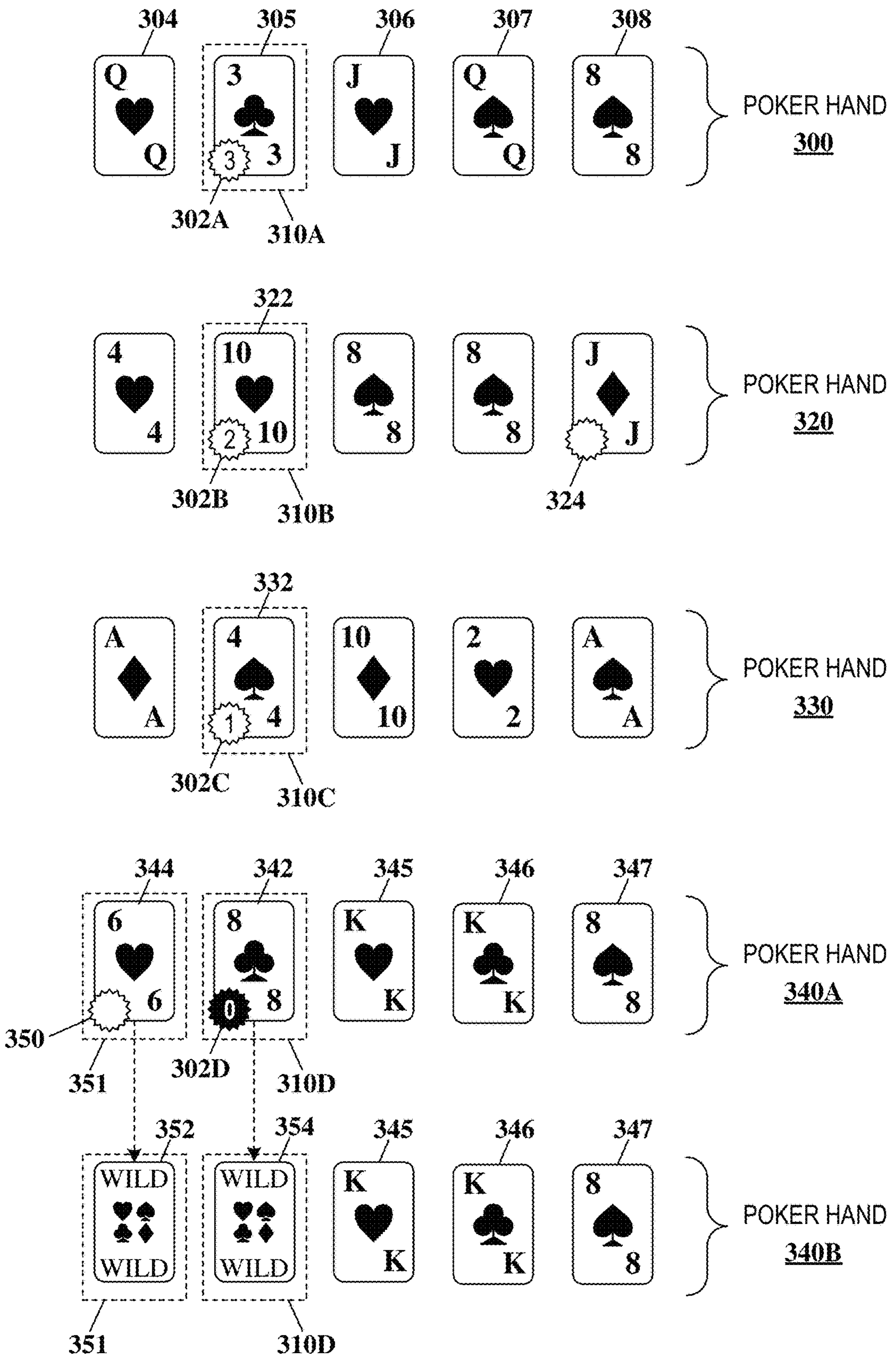
FIG. 3 depicts an example of incrementing an award enabler towards a threshold in a representative single-hand draw poker context.

FIG. 3 is described in the context of such an electronic poker game embodiment. A poker hand 300 is dealt. The poker game may involve stud poker, draw poker, single-hand or multi-hand poker, etc. The illustrated embodiment of FIG. 3 assumes single-hand draw poker. One embodiment involves using an indicator, such as sub-symbol 302A, to identify a count or other tracking means. The sub-symbol 302A may be presented with any of the cards 304-308 of the hands being played, and in one embodiment displays a count of how many further hands are to be played until an action is taken that is at least potentially favorable to the player. As the further hands are played, the changing count value may be maintained on the sub-symbol 302A at the card position 310A associated with the sub-symbol 302A.

More particularly, assume that on the deal of the poker hand 300, the sub-symbol 302A is randomly provided, and exhibits a count value of three (3). This means that in three more played hands, an action will occur that is favorable to the poker hand result of that later poker hand.

On the next played poker hand 320, the sub-symbol 302B remains associated with the card position 310B and/or the card 322 dealt to that position. However, the sub-symbol 302B or any other indication of the current count value could be used.

In accordance with one embodiment, as additional poker hands are played, other sub-symbols 324 may be provided on other cards. These sub-symbols may, or may not, be associated with a new count value. For example, the sub-symbol 324 of poker hand 320 provides no count value. In one embodiment, these additional sub-symbols may be used in an action that is triggered when the count value associated with one of the sub-symbol or other indicators reaches its threshold value (e.g., a count decrements to zero). In other embodiments, the sub-symbol 324 may additionally provide some other benefit, such as a multiplier or other payout modifier, award, etc.

Poker hand 330 depicts the next played poker hand. The sub-symbol 302C remains associated with the card position 310C and/or the card 332 dealt to that position. No additional sub-symbols occurred during poker hand 330. Also, in one embodiment, the sub-symbol 324 from poker hand 320 does not carry over into the next poker hand 330, because it is not associated with a count value. Thus, in one embodiment, the count value and/or other tracked characteristic(s) provides the sustained advancement of the sub-symbol 302A, 302B, 302C, etc.

As seen in poker hand 330, the count value associated with the sub-symbol 302C has decremented to one. Assuming the threshold condition is reaching a count of zero, the next hand will be involved with the action associated with the expired counter. This is depicted at poker hand 340A, where the sub-symbol 302D associated with the card 342 and/or card location 310D depicts a count of zero. Thus, the action associated with such count expiration or other tracking methodology is triggered.

In one embodiment, the action associated with the expired counter could be enhanced card or feature, such as providing a Wild card at the card location 310D where the sub-symbol 302D has expired.

In another embodiment, the action is dependent on other occurrences in the poker hand, such as additional sub-symbols being presented on one or more other cards 344, 345, 346, 347.

Particularly, one embodiment involves enhancing the card 342 at the card position 310D associated with the sub-symbol 302D whose count expired, and any other adjacent cards 344, 345 in which a sub-symbol is presented during that poker hand 340A. In the example of FIG. 3, a sub-symbol 350 has been provided with card 344 at card location 351 of poker hand 340A, and since it meets the criteria of having a sub-symbol associated therewith and is adjacent to the location 310D with the expired count, card 344 will also be enhanced. This is depicted at the second state of poker hand 340B, where card locations 351 and 310D have been upgraded to Wild cards 352, 354 respectively. Thus, the enhancement of original cards 344, 342 into Wild cards 352, 354 has resulted in four-of-a-kind in Kings for the final poker hand 340B.

Thus, one embodiment involves using sub-symbols or other indicators to provide a count towards a threshold, which when reached, results in all adjacent cards with sub-symbols or other indicators associated therewith being enhanced.

In other embodiments, rather than Wild cards 352, 354 being provided, other enhanced cards and/or features may be provided, including but not limited to Wild cards with multipliers, multipliers or other payout modifiers, cards involved in special features such as card duplication, split cards, or the like. The triggering event may be set as desired, such as a mystery trigger, or sub-symbol on dealt cards, or particular cards that may be dealt (e.g., any Two dealt receives a sub-symbol, where one or more may randomly be provided with a counter for the sustained advancement card enhancement feature, or when a card comes up that the player has elected to serve as the trigger), etc.

Betting structure may be done as desired, whereby the cost to participate in the enhancement features described herein may be built into the normal cost per hand or per game, or may involve an additional single wager, or may involve an additional wager per hand played, etc. In one example, a wager to play a poker hand may be five credits, and an additional one credit is paid to participate in the enhancement features described herein, or an additional one credit per hand may be involved to participate in the enhancement features. In other embodiments, the player may purchase one or more positions to provide the card enhancement features on future hands, such as paying X credits for a card position in the first hand to provide an enhanced card/feature in some number of future hands. Any credit structure desired to accommodate the math to provide payouts at the desired rate may be employed.

For example, in one representative example, a single hand of video poker may involve a player bet of five credits for the hand play, and five credits for participation in the card enhancement feature. A sub-symbol or other indicator may randomly occur on one or more cards, which includes or is associated with a count or other tracking feature, to enhance cards that have sub-symbols (or any qualifying indicia or criteria) and are adjacent to one another. In other embodiments, adjacency may not be part of the criteria, but rather any cards exhibiting the sub-symbol or other qualifying indicia when the count expires may be enhanced, or cards in certain positions, or cards having certain characteristics (e.g., any spade, or any non-face card, etc.), or the like. In one embodiment, every card in the hand has a chance to have the indicating sub-symbol presented thereon. In other embodiments, there may be criteria to limit which card positions may be awarded such sub-symbol. In still other embodiments, the availability of sub-symbols at locations may be dependent on other factors, such as the card dealt to particular positions, such as providing the sub-symbol at locations where certain card ranks (e.g., Jacks, etc.) and/or card suits are presented.

Another representative example involves a multi-hand draw poker format, such as where an initial hand is dealt, and cards held in the initial hand are replicated into the other hands, whereby non-held and non-replicated cards are then drawn to form final hands. For example, in a triple-play version, three hands would be dealt, where the player would hold cards in one of those hands that would be replicated in the other hands. A representative betting structure may be, for example, a 5+5 structure for a total of thirty credits (e.g., five credits to play each of the three hands, plus five credits to be eligible for the card enhancement feature for each of the three hands). A representative example of playing such a triple-play version might be, for example, to use sub-symbols on cards to provide a chance for the advancement towards the threshold (e.g., a countdown meter), and when the threshold is met, adjacent cards exhibiting sub-symbols (or other qualifying indicia/criteria) may be enhanced, and may do so across hands of the multi-hand poker environment.

Figure 4:
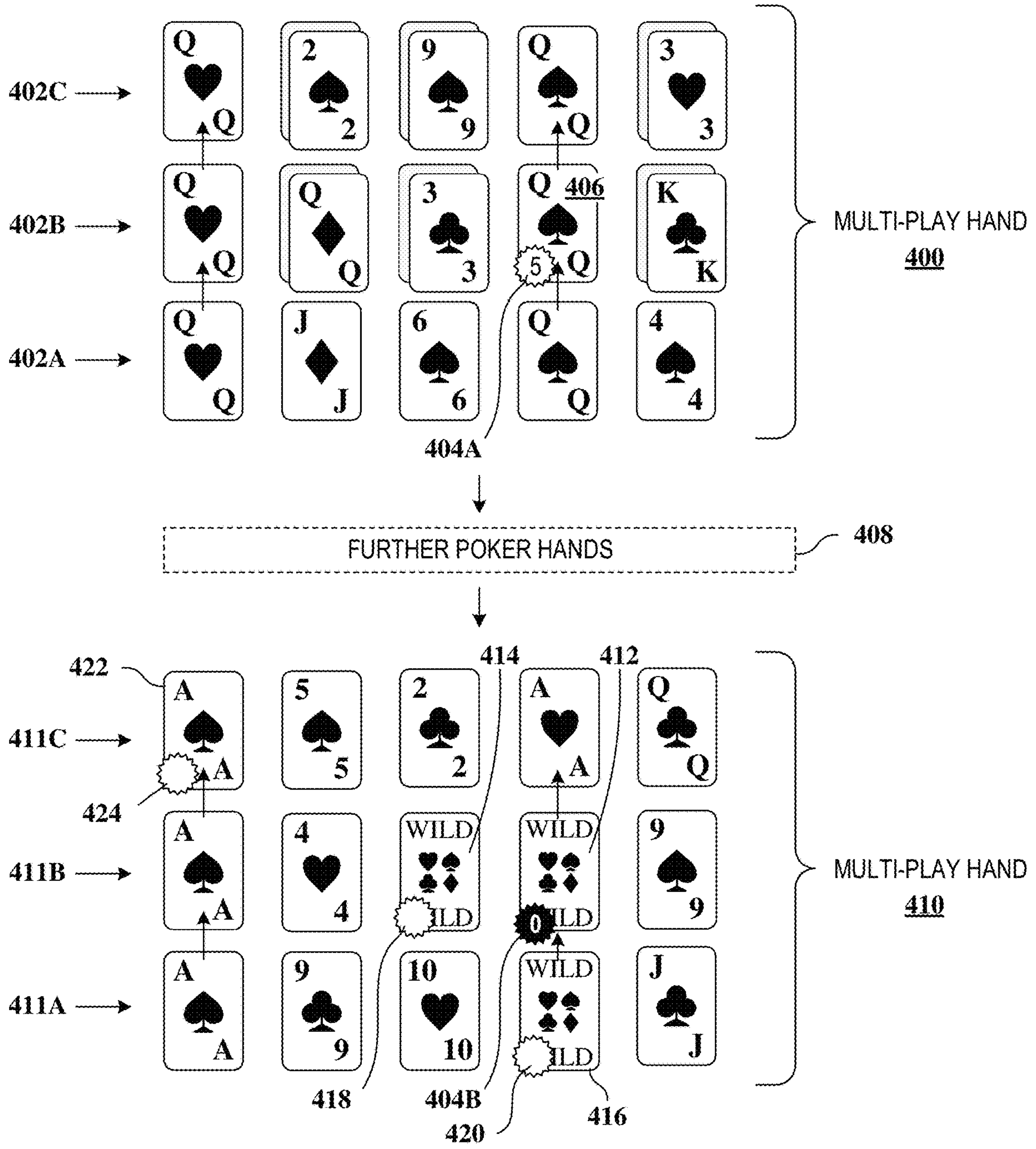
FIG. 4 depicts an example of incrementing an award enabler towards a threshold in a representative multi-hand draw poker context.

FIG. 4 depicts a representative example of a multi-hand draw poker game employing the card enhancement features described herein. A multi-play hand 400 is played, which includes an initial deal of a hand 402A, and two more (in this example) hands 402B, 402C. In one embodiment, cards held in the initial hand 402A are replicated into corresponding card positions of other hands 402B, 402C (although the cards could be replicated into any of the card positions of the other hands 402B, 402C). After cards are replaced by being drawn into the non-held card positions, final hands result for each of the hands 402A, 402B, 402C.

In this example, a sub-symbol 404A is randomly associated with a card 406, although card 406 could be highlighted or otherwise distinguished to reveal the count or other tracking means. In this example, a count of five is provided with a randomly-presented sub-symbol 404A. Thus, on the fifth consecutive played hand, the count will decrement to zero (the assumed threshold for this example), and any cards having qualifying criteria (e.g., other sub-symbols) associated therewith will be enhanced, such as being changed to Wild cards. More particularly, further poker hands 408 are played until reaching multi-play hand 410 (which includes hands 411A, 411B and 411C) where the counter has reached the threshold count of zero, as seen by sub-symbol 404B. As a result, that card position is enhanced to a Wild card 412, as are adjacent cards 414 and 416 that are adjacent to card 412 with the threshold-reaching counter and also exhibit sub-symbols 418, 420 respectively. With rules such as this example assumes, card 422 would not be enhanced even though it exhibited a sub-symbol 424, as it is not adjacent to the card 412 and/or respective card position of card 412 where the sub-symbol counter reached the threshold.

In one embodiment the cards may be enhanced to Wild cards (or other) before non-held cards are drawn/replaced, while in other embodiments the cards may be enhanced to Wild cards (or other) after non-held cards are drawn/replaced.

Adjacency can be defined as desired, such that the cards are to be directly above or to the left or right of the card to qualify for the card enhancement, or diagonal cards may also qualify, or in other embodiments even cards on the opposite side of the play grid may qualify (e.g., a card in a poker hand to the far right may be deemed adjacent to a card in that hand to the far left, in a “wrap-around” fashion).

In other embodiments, some defined positional relationship to the marked card position with the counting feature may be the criteria, whether that positional relationship is “adjacency” or not. For example, such a defined positional relationship may involve multiple card positions away (e.g. 2 card positions away), or may involve being within multiple card positions (e.g. within 2 card positions), or a particular distance away from the marked card position with the counting feature (e.g. beyond the adjacent card positions), or if they are on a corner position of a multi-hand card array, or random locations, etc.

Multiple sub-symbols or other indicia may be provided with a count concurrently, and if they are adjacent when the first of them reaches the threshold, the associated card will be enhanced. If they are not adjacent when the first of them reaches the threshold, both may count to the threshold independent of one another.

If a card position is deemed the recipient of an enhanced card, but in a multi-play context might also be the recipient of a replicated card, one embodiment involves taking the best of the replicated card and the enhanced card. In another embodiment, the enhanced card will occupy card position. In another embodiment, the held card will occupy card position. In still another embodiment, the player can choose which of the enhanced card or the replicated card will occupy such card position. Still other embodiments may impose different rules in cases of card positions subject to both the enhanced card and a replicated held card, and those provided herein are representative and do not represent an exhaustive list.

Figure 5:
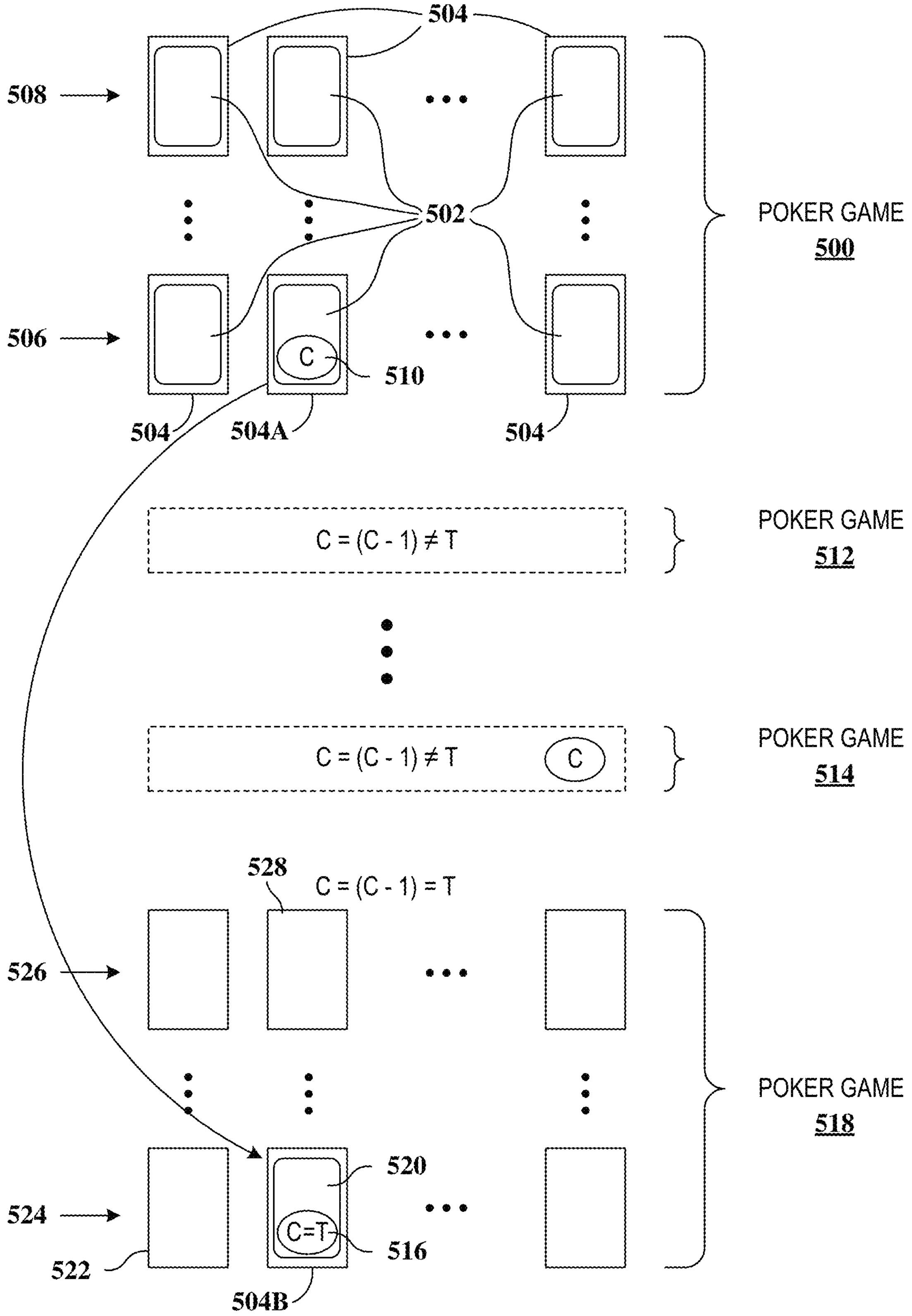
FIG. 5 illustrates a representative electronic poker activity involving consecutively-played poker games that incorporates the disclosed count progression functionality over multiple poker games.

FIG. 5 illustrates a general, representative electronic poker activity involving a plurality of consecutively-played poker games that incorporates the disclosed countdown (or count up, or other tracking) functionality over a plurality of poker games or other gaming events. The countdown functionality in this embodiment occurs until reaching a countdown threshold in a future poker game, thereby benefitting that future poker game with one or more enhanced cards.

Particularly, the embodiment of FIG. 5 includes a gaming event that has numerous game play items, that utilizes a tracked advancement over a plurality of the gaming events toward reaching a threshold, that upon reaching, improves or otherwise enhances particular game play items. In the illustrated embodiment of FIG. 5, the gaming event is an electronic poker game 500 and the game play items are cards 502 dealt to or otherwise provided to card positions 504. In the illustrated embodiment, the poker game 500 includes multiple hands of the cards, such as hand 506 through some indeterminate number of poker hands identified by hand 508.

In connection with play of poker game 500, one or more of the card positions 504, 504A may be randomly identified as a position to be associated with a future card enhancement. In the illustrated embodiment, card position 504A has been randomly identified as a card position in which a card enhancement will be forthcoming in a future gaming event.

An advancement or other progression tracking mechanism is used to determine which future poker game will be the beneficiary of the card enhancement. In the illustrated embodiment, a sub-symbol 510 or other indication is displayed or otherwise presented in connection with the card 502 at the randomly identified card position 504A. The sub-symbol 510 may directly indicate or indirectly reference the count value “C” in this example, where “C” represents a value that can progress from a first state to another state such that a player can recognize the point at which the counter will reach the threshold. For example, the count value might be the letter “T,” which increments on each poker game played to a known (or randomly provided) letter, such as “Z” where a card enhancement will be provided. Or, the count value might be a number, such as “5,” which decrements on each poker game played until reaching a threshold value, such as zero, at which time a card enhancement will be provided.

If the count value “C” provides for only one “count,” such as a count value of “1” where on the next poker hand 512 the count has decremented to an assumed threshold of zero, then no interim poker hands would be played before the benefit-receiving poker hand can use the enhanced card. In other cases, the count may be such that one or more intermediate poker hands will be played, without receiving the particular card enhancement from poker game 500 receiving the sub-symbol 510. FIG. 5 depicts such intermediate poker games 512 through 514, where it is assumed that the count value has not yet reached the threshold. This is depicted by $C=(C-1)\neq T$, where C is the count value and T is the threshold, such that when C is decremented (i.e. $C=C-1$), it has not yet reached the threshold value T.

Eventually, the counter C advances (e.g. decrements in this example) to a point where it meets the threshold T, shown at the sub-symbol 516 at the card position 504B of poker game 518 that corresponds to the card position 504A from where the sub-symbol 510 originated. In one embodiment, the card 520 that is dealt to or otherwise available at the corresponding card position 504B is the card that is enhanced, such as being dealt as or replaced with, for example, a Wild card. In other embodiments, the enhanced card may be a Wild card with multiplier; a multiplier; a Split card, a high value card (e.g. an Ace where four Aces provides a higher payout than other four-of-a-kind), a high value card based on other cards in the hand (e.g. another Diamond if four Diamonds have been dealt to the other positions of the hand), or the like.

In another embodiment, one or more cards other than the card at the corresponding card position 504B are enhanced based on other factors, such as their relative proximity to the card position 504B, whether and where other symbols are presented on the poker game 518, whether certain cards, card suits, card ranks, card subsets, and/or other card characteristics are presented on other cards of the poker game 518, etc. For example, in one embodiment, cards adjacent to the card 520 at the corresponding card position 504B may be provided with the enhanced card(s), in some cases without the card 520 also being provided with an enhanced card, and in some cases with the card 520 also being provided with an enhanced card. For example, in an embodiment where cards adjacent to the card position 504B are enhanced, one or more of the cards at card positions to the immediate left (e.g. card position 522) or immediately to the right (not shown). An adjacent card may instead or additionally be above or below the card position 504B, in other hands, when multiple hands are involved. Adjacency may also, in some embodiments, involve a wrap-around adjacency, such as if poker game 518 included one or more hands between hands 524 and 526, a card position "below" card position 504B would wrap around to the top card position 528.

During some plays of the poker games or other gaming events, there may be no counters active in connection with play. For example, no indicators (e.g. sub-symbol, card highlights, etc.) may be randomly provided in connection with a card position or otherwise associated with a card. At some point, a sub-symbol or other indication may be randomly presented in connection with a card at a randomly identified card position, which may directly display or reference another display/presentation of a count value or other counting or tracking mechanism.

Figure 6:
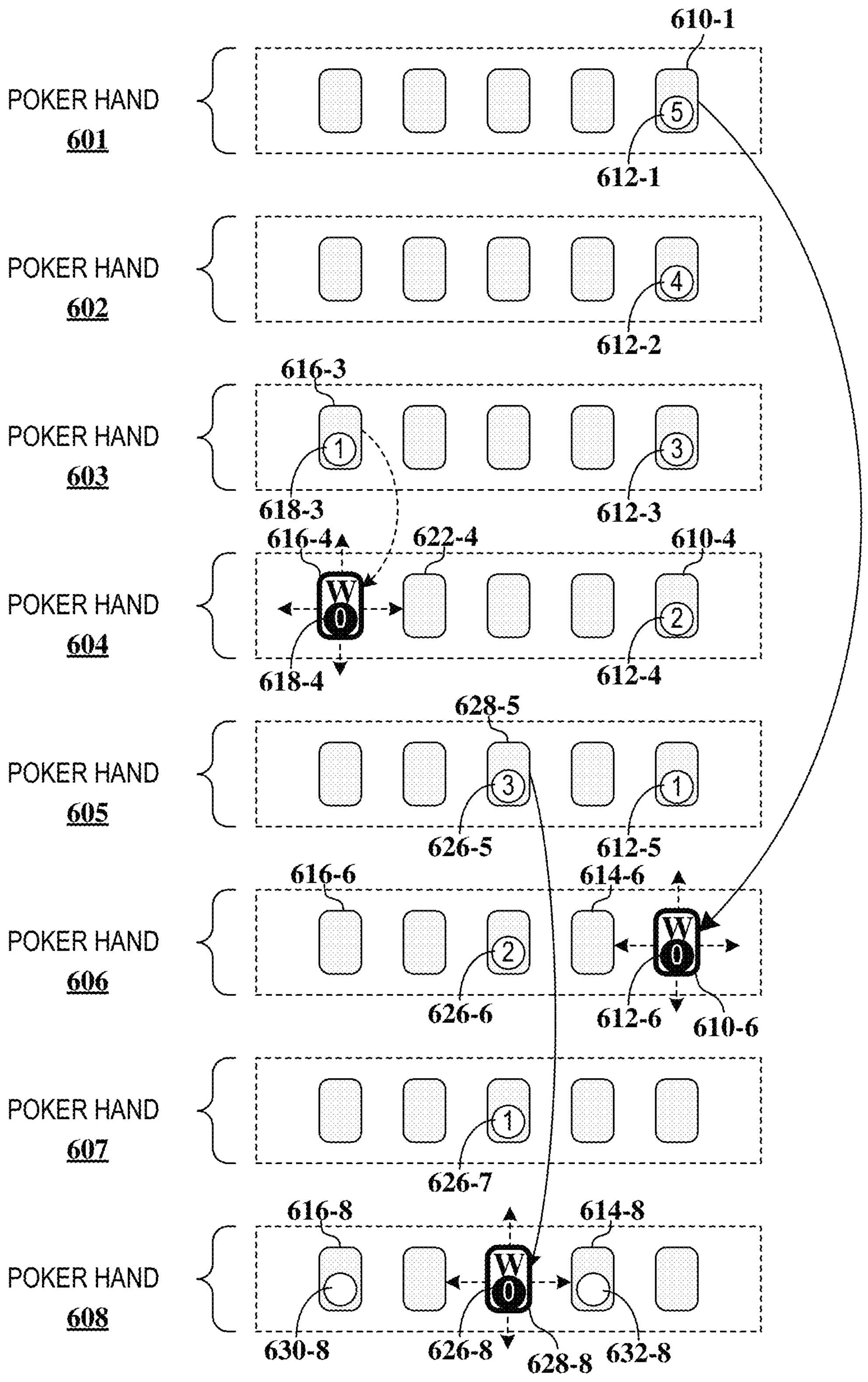
FIG. 6 depicts an electronic poker embodiment where multiple counters are concurrently active, each of which may begin and/or end on any poker hand as the player continues playing poker games.

In still other embodiments, multiple counters may be active in parallel, and may overlap such that counters reach their respective thresholds at the same or different times, thereby providing the player with multiple opportunities for future hand enhancement. FIG. 6 provide a representative example of multiple counters being concurrently active in the context of an electronic poker game, where each counter may begin and/or end on different poker hands as the player engages in play of consecutive poker games. While the embodiment of FIG. 6 is described in terms of consecutively-played poker games, the principles are also applicable to other games such as keno, bingo, slot games, or the like.

It should be recognized that the count may advance towards its threshold in any desired manner. In one embodiment, the count advances by one for each poker game played, such as decrementing to a threshold or incrementing to a threshold. In another embodiment, the count me advanced by any number, and not by just one. In one embodiment, the count may advance a greater amount for higher wagers, and a lower amount for lower wagers (e.g. for non-maximum wagers the increments are by one, and for maximum wagers the increments are by two). The count may increase beyond a standard count (e.g. count of one each poker game played) based on other criteria, such as allowing a count by more than one during a losing streak, etc. The advancement might not be fixed, but rather may advance in a random fashion, such as by decrementing towards a threshold by either one, two or three (or by any random count value within a range of available count values) on any given new poker game play. The advancement might not occur unless some other event occurs, such as a particular card or card rank or card suit (or the like) occurring with the card position with which the counters associated therewith. Thus, references to a count advancing or otherwise progressing towards its threshold may be done in any desired manner.

In the illustrated embodiment of FIG. 6, a subset of a series of gaming events (e.g., poker hands) is depicted, including consecutively-played poker games/hands 601-608. While the current example is described in terms of single-hand poker (and thus each poker game involves a poker hand), the description is equally applicable to poker games involving multiple hands, such as multi-play poker where multiple poker hands are played concurrently, with the ability to replicate cards held in one hand into corresponding card positions of the other hands.

In a first poker hand 601, a card position 610-1 is randomly designated as a position in which a future card enhancement may occur. In this embodiment, a sub-symbol 612-1 is presented in connection with the randomly designated card position 610-1 to serve multiple purposes, one of which is to identify the card position that will receive the future benefit (e.g. future card enhancement), and to present a count or other tracking value capable of identifying a future hand that will be the subject of the future benefit. Such a count or other tracking value may be a fixed value (e.g., always a count of, for example, five), or may be a random count value within a designated range of available count values, or may be based on other card features (e.g. based on a number of face cards dealt, or the number of Eight cards dealt, or the wager played, etc.), or otherwise defined. In the example of FIG. 6, it is assumed that the count value presented at the initiating sub-symbol 612-1 is randomly selected from a pool of available count values, and is depicted as a count of "5" in this example.

On each subsequently played hand, the count value will decrement (in this example) towards a threshold (assumed to be zero in this example) at which time an enhanced card will be provided at the corresponding card position (or in other embodiments, in the hand where the count value reach the threshold, but in a different card position). As seen at each of the poker hands 602, 603, 604, 605 and 606, the count value in the respective sub-symbols 612-2, 612-3, 612-4, 612-5, and 612-6 decrement towards zero (the threshold in this example), and thus that poker hand 606 will receive an enhanced card(s) benefit.

In one embodiment, the card position 610-6, that corresponds to the original card position 610-1 in which the sub-symbol 612-1 originated, is where the enhanced card will be provided. In the example of FIG. 6, this is depicted as a Wild card (W) at corresponding card position 610-6.

In another embodiment, the card(s) that are enhanced include the cards at card positions adjacent, or otherwise positionally relative to the corresponding card position 610-6 in some defined way (e.g. two cards away, above but not below, left card but not right card, etc.). Identification of such "adjacent" cards is depicted by the left, right, up, down arrows associated with card position 610-6. Thus, in one embodiment, sub-symbol 612-6's counter reaching the threshold at card position 610-6 of poker hand 606 may cause any one or more of its adjacent card positions to be furnished with an enhanced card (whether the same enhanced card or different enhanced cards). For example, left adjacent card position 614-6 may receive an enhanced card, and/or right adjacent card position 616-6 may receive an enhanced card (wrap-around to the right). In multi-hand embodiments where additional hands are positioned above and/or below (including wrap-around situations) the card position 610-6, above adjacent and/or below adjacent card positions (not shown in this single-hand embodiment) may receive an enhanced card. In one embodiment, the corresponding card position 610-6 receives an enhanced card in addition to one, some, or all of the adjacent card positions, where in other embodiments the corresponding card position 610-6 does not receive an enhanced card in addition to one, some, or all of the adjacent card positions.

In other embodiments described below, only card positions that are randomly identified in some manner (e.g. a sub-symbol or other perceivable indication) will receive enhanced cards when a count value reaches the threshold (such as the count at sub-symbol 612-6). In still other embodiments, only card positions that are both randomly identified in some manner (e.g. a sub-symbol or other perceivable indication) and are adjacent or otherwise positionally related in a defined manner to the card position 612-6 (which is associated with the threshold-reaching count value) will receive enhanced cards when a count value reaches the threshold. In still other embodiments, card positions that either are randomly identified in some manner (e.g. a sub-symbol or other perceivable indication) or are adjacent or otherwise positionally related in a defined manner to the card position 612-6 (which is associated with the threshold-reaching count value) will receive enhanced cards when a count value reaches the threshold.

In still other embodiments, cards of the poker hand 606 in which the count value reached the threshold may at least partially dictate which card positions will receive an enhanced card. For example, where the count value depicted at the sub-symbol 612-6 at card position 610-6 reaches the threshold (zero in this example), a rule may be established that certain cards dealt to the card positions of hand 606 will be replaced with the enhanced card. An example would be that any Two cards would be replaced with Wild cards, or any Pair would be replaced with a Pair of Aces, or any Hearts would be replaced with a Wild card, or any odd value card would be replaced with an enhanced card, etc.

Multiple count progressions may occur in parallel in one embodiment. In the example of FIG. 6, another count value becomes active at poker hand 603, where the sub-symbol 618-3 at card position 616-3 identifies a count value of "1." On each subsequently played hand, the count value will decrement (in this example) towards a threshold (assumed to be zero in this example) at which time an enhanced card(s) will be provided. Since the count value is only "1" in this example, and the threshold count is "0," on the next played poker hand 604, the count expires and reaches the threshold as seen by the "0" count value in the sub-symbol. As previously indicated, based on the rules of the particular poker game, card enhancements may be provided at the corresponding card position 616-4, and/or adjacent card positions, and/or card positions associated with randomly-presented indicia, and/or card positions having cards with certain card or card result characteristics, etc. For example, left and right adjacent cards in this single-hand poker hand 604 may be enhanced, such as the right adjacent card position 622-4 and the left adjacent card position 610-4 (based on left wrap-around to the right). Thus, cards at card positions 610-4 that already include a count value via sub-symbol 612-4 may also, in some embodiments, be the recipient of an enhanced card from another progression towards a card enhancement.

In the example of FIG. 6, still another count value becomes active at poker hand 605, where the sub-symbol 626-5 at card position 628-5 identifies a count value of "3." On each subsequently played hand, the count value will decrement (in this example) towards a threshold (assumed to be zero in this example) at which time an enhanced card(s) will be provided. The count value therefore decrements once at poker hand 606 revealing a count of "2" via the sub-symbol 626-6, decrements again at poker hand 607 revealing a count of "1" via the sub-symbol 626-7, and decrements again at poker hand 608 revealing a count of "0" via the sub-symbol 626-8, where the enhanced card(s) will thereby be provided.

As previously indicated, based on the rules of the particular poker game, card enhancements may be provided at the corresponding card position 628-8, and/or adjacent card positions, and/or card positions having cards with certain card or card result characteristics, etc. In one embodiment, the card enhancements may be provided exclusively or non-exclusively at card positions exhibiting some indicia, such as a sub-symbol 630-8, 632-8 or other indicia designating that respective card positions 616-8, 614-8 as eligible for a card enhancement. In another embodiment, the card enhancements may be provided exclusively or non-exclusively at card positions that both exhibit some indicia like sub-symbol 632-8 and also are adjacent to the card position 628-8 in which the counter reached the threshold, in which case card position 616-8 would not qualify as it is not adjacent to card position 628-8. In such embodiments, card position 626-8 may or may not also receive an enhanced card, depending on the rules of the particular game. Sub-symbols 630-8 and/or 632-8 may or may not also include new initial count values, or may be different indicia entirely such as indicia associated with cards dealt to the respective card positions 616-8, 614-8 whereby card enhancement is based on card characteristics of those cards in those positions.

Figure 7:
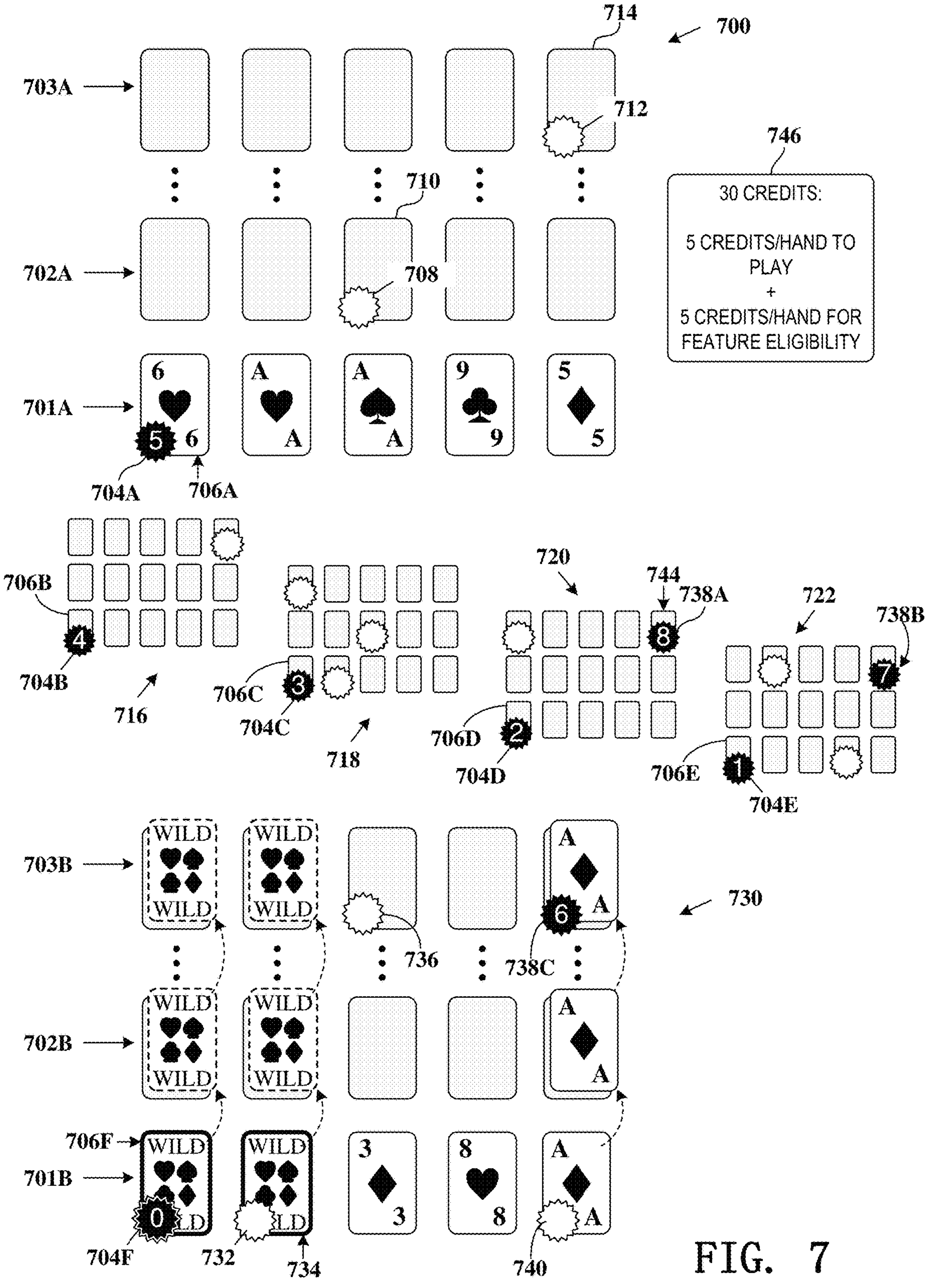
FIG. 7 depicts a representative example of providing future card enhancements in multi-play poker games based on triggering events occurring in earlier multi-play poker games and relative positioning of enabling indicia.

FIG. 7 depicts a representative example of providing future card enhancements in multi-play poker games based on triggering events occurring in earlier multi-play poker games and relative positioning of enabling indicia. A multi-hand poker game 700 is shown, having a first poker hand 701A, at least one additional concurrently played hand 702A, and up to any desired number of additional hands. In the illustrated embodiment, another concurrently played hand 703A is also provided, such that three hands 701A, 702A, 703A will be concurrently played. For purposes of this example, the multi-hand game is assumed to be played in a multi-play manner, where cards held in a first hand (e.g.

hand 101A) will be replicated into the other hands (e.g. 702A and 703A), and cards that are not held or replicated will be discarded and replaced in a draw poker manner. Thus, in the example of FIG. 7, the multi-play embodiment is a "triple-play" embodiment, as three hands are concurrently played in this manner.

In this example, any of the cards of any of the hands 701A, 702A and/or 703A may or may not receive some indication that the subsequent hand(s) will obtain an enhanced card(s) or other benefit. While the manner of providing such indication may be done in any manner, the embodiment of FIG. 7 employs sub-symbols proximate cards and/or their associated card positions to identify the respective card position(s) as potentially eligible for the future benefit. For some poker games, no such indication may arise to provide the subsequent hand benefits. In other embodiments, one or more such indications may arise to provide the subsequent hand benefits, and one or more such indications may represent card positions that may receive an enhanced cards.

In the illustrated embodiment of multi-hand poker game 700, three such indications arose, including sub-symbol 704A associated with card position 706A of hand 701A, sub-symbol 708 associated with card position 710 of hand 702A, and sub-symbol 712 associated with card position 714 of hand 703A. Two of the sub-symbols, namely sub-symbol 708 and 712, represent enabling indicia that would, in one embodiment, enable card enhancements under certain circumstances if a counter reaches a threshold during play of that poker hand 700. Randomly-presented sub-symbol 704A is associated with a count value, but will not reach its benefit-awarding threshold until a subsequent poker hand.

In one embodiment, sub-symbols that are not associated with a tracked item, such as sub-symbols 708, 712, may randomly appear in connection with cards and/or card positions of the poker hands being played. These non-counting/non-tracking sub-symbols or other indications may appear and disappear on any of the cards of the hands, may remain presented on one or more cards for one or more poker hands, may remain with the card positions for the entire duration that another sub-symbol with a counter progresses towards its threshold, etc. In the illustrated embodiment, when reaching the next poker hand 716, the sub-symbol 704B remains in place at card position 704B, and its counter is decremented towards its threshold of zero in this example. Sub-symbol 708 from poker game 700 disappeared for poker game 716, while sub-symbol 712 remained (or was again randomly presented at the same place). On each of the next poker hands 718, 720, 722, the sub-symbol 704C, 704D, 704E depicts its decrementing count value (i.e., 3, 2, 1), while other non-counting sub-symbols are randomly provided among the poker hands/cards. As previously noted, in one embodiment, the non-counting sub-symbols (e.g. 708, 712) provide no additional functionality unless a counter has reached its threshold, while in other embodiments the non-counting sub-symbols provide benefits such as multipliers or other modifiers, credit values, collectable items towards awards, and/or other awards, in addition to being a potential target for an enhanced card if/when a counter value reaches its threshold.

On the next played hand 730, the count value associated with sub-symbol 704F has decremented to zero, which in this example represents the threshold value. Therefore, one or more enhanced cards will be made available for hand 730.

In one embodiment, the card(s) to be enhanced is the card at the card position 706F where the sub-symbol 704F having the threshold-meeting count value is located. In such an embodiment, the card at card position 706F is enhanced, such as changing to a Wild card in the present example. Because the present example is a multi-play embodiment, the player may choose to hold the Wild card at card position 706F, thereby having it replicated into corresponding card positions of the other hands 702B, 703B.

In another embodiment, the card(s) to be enhanced are the cards having sub-symbols associated therewith, that are adjacent to the card position 706F where the count value reached its threshold. For example, non-counting sub-symbol 732 at card position 734 is adjacent to card position 706F, and in this embodiment would be enhanced, such as with a Wild card. Again, because the present example is a multi-play embodiment, the player may choose to hold the Wild card at card position 734, thereby having it replicated into corresponding card positions of the other hands 702B, 703B. In such an embodiment, cards at card positions with sub-symbols that are not adjacent to card position 706F (which has the count value that reached the threshold) are not enhanced, as is the case for sub-symbols 736, 738C and 740 where their respective card positions are not enhanced. However, in other embodiments, all cards having the sub-symbols 704F, 732, 736, 738C, 740, without regard to adjacency, may be enhanced (now shown).

In one embodiment, only cards at card positions (e.g. 734) having non-counting indicia (e.g. sub-symbol 732) and adjacent to the card position (e.g. 706F) having the counting indicia (e.g. sub-symbol 704F) are enhanced. In another embodiment, the card at the card position (e.g. 706F) having the counting indicia (e.g. sub-symbol 704F) is also enhanced, such as depicted in FIG. 7 where both card positions 706F and 734 receive Wild cards.

The enhanced cards may allow one or more of the hands 701B, 702B, 703B to receive a better winning result, and/or a higher payout, than it otherwise would have without the benefit of the enhancement card(s).

FIG. 7 also illustrates that additional sub-symbols (or other indicia) associated with counters may be presented and progress towards their respective thresholds while other pre-existing count values are also progressing towards their respective thresholds. For example, poker hand 720 depicts the random presentation of the sub-symbol 738A at card position 744, which progresses towards its threshold on each successive, subsequent poker hand. More particularly, the count value associated with sub-symbol 738A is "8," and on the next poker hand 722 the count value associated with sub-symbol 738B decrements to "7," and on the next poker hand 730 the count value associated with sub-symbol 738C decrements to "6," and so forth.

Any desired wagering structure may be used, whether incorporated into a single wager to play the poker game, whether being eligible for the subsequent hand enhanced card feature involves an extra payment of some kind, etc. The embodiment of FIG. 7 assumes a 5+5 structure for a total of thirty credits for a 3-hand poker game, involving five credits to play each of the three hands 701A, 702A, 703A in poker game 700 and hands 701B, 702B, 703B in poker game 730, plus five additional credits to be eligible for the card enhancement feature for each of the three hands, as depicted at the notice display 746. However, the betting structure may be managed in any way desired, such as 5+1, 5+2, 5+3, 5+4, 5+5, 5+45, etc.

Some embodiments may also be employed to determine whether an indication to provide a subsequent hand benefit will be active (thereby enabling the subsequent hand benefit) or passive (thereby not enabling the subsequent hand benefit). For example, the player may place additional wagers to activate card positions or card columns or hands, etc. If the indicators are randomly or otherwise provided in an activated card position or column, the indicator will be active, thereby enabling the subsequent hand benefit to be provided when a counter reaches its threshold. In such a case, there might be no additional general wager to be eligible for the subsequent hand benefit, but rather the additional wager(s) is to make eligible certain portions (subset or the entire set) of card positions in which received indicators activate the subsequent hand benefit features.

Figure 8:
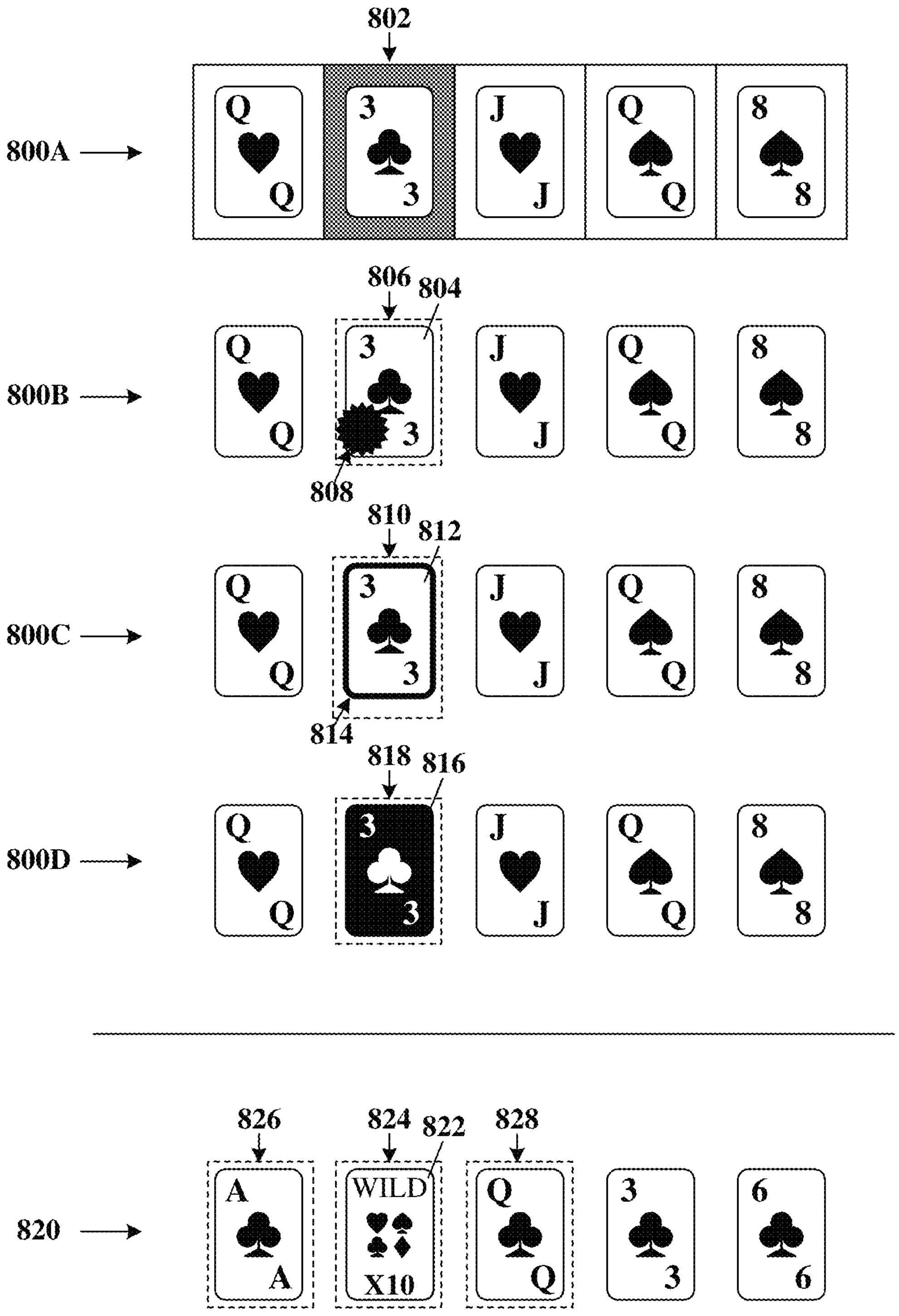
FIG. 8 depicts representative manners of identifying game play item positions for subsequent game play item enhancement.

FIG. 8 depicts representative manners of identifying card positions (or other game play item positions) for subsequent card/game play item enhancement. Those identified in FIG. 8 are depicted as examples only, as any manner of identifying such positions may be employed. Representative hand 800A depicts that the card position 802 itself may be highlighted, such as a color, background, highlight, shape, etc. Representative hand 800B depicts that the card 804 may provide the indication at the card position 806, such as via a sub-symbol 808 or other signifier. Representative hand 800C depicts that the card position 810 for a card 812 may exhibit the indication, such as a colored or otherwise highlighted border 814, shape, visual flashing, audio indicator (e.g., "the card position associated with the 3 of Clubs is marked for future enhancement"), etc. Representative hand 800D depicts that the card 816 may provide the indication at the card position 818, such as a change to the card characteristics, such as a color change, font change, negative effect as depicted in FIG. 8, larger sized card, etc. In any of these or other card position identifiers, the subsequent hand 820 may be modified to provide an enhanced card 822 at the corresponding card position 824. In other embodiments, the enhanced card 822 may instead or additionally be provided at adjacent card positions 826, 828. In still other embodiments the enhanced card 822 may instead or additionally be provided at adjacent card positions 826, 828 that also include an associated sub-symbol (not shown in FIG. 8).

Figure 9A:
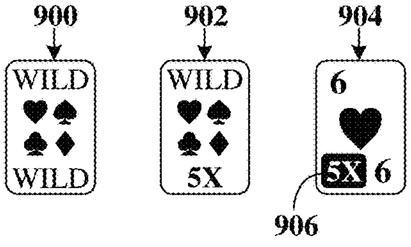
FIGS. 9A-9C depict examples of representative types of enhanced cards that may be provided on eligible subsequent hand card positions.
Figure 9B:
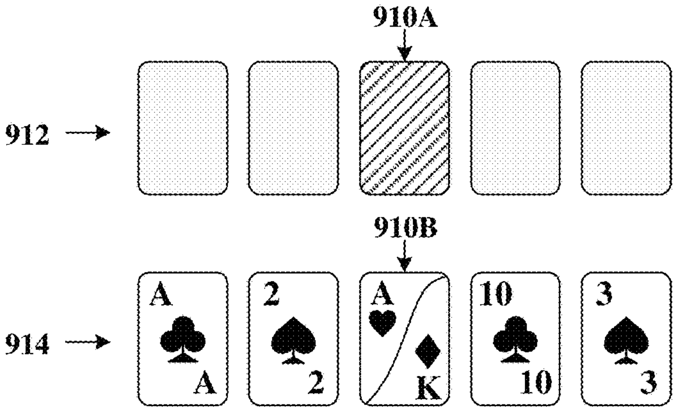
Figure 9C:
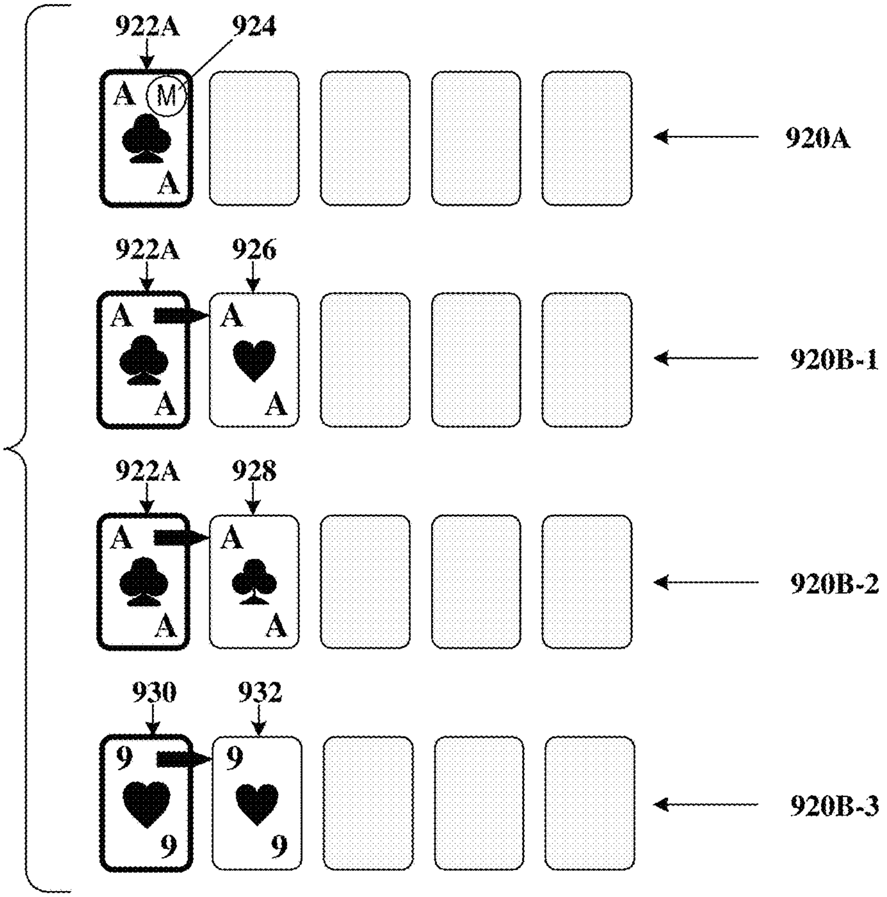

FIGS. 9A-9C depict examples of representative types of enhanced cards that may be provided on eligible subsequent hand card positions. Those examples in FIGS. 9A-9C are merely representative examples, and other manners of enhancing cards or hands may alternatively or additionally be employed.

FIG. 9A depicts some examples described previously herein, including Wild cards 900, Wild cards with a multiplier 902 or other modifier, and cards 904 providing a multiplier 906 or other modifier. Some embodiments have a single enhancement card (e.g. Wild cards 900), where other embodiments may allow the use of two or more enhancement cards such as randomly selecting between a Wild card 900, Wild card with multiplier 902, and a multiplier 906. In the case of multipliers (e.g. cards 902, 904), an awarded multiplier in a subsequent hand where a count reached its threshold may be applied to the hand in which the card 902, 904 is provided, or in other embodiments may be applied to all hands of a multi-hand poker game, etc.

FIG. 9B depicts another example of a card enhancement that may be provided on an eligible subsequent hand. This embodiment represents a Split Card embodiment, where multiple cards may occupy a card position, which is also described U.S. Pat. No. 8,323,085, entitled "Method And Apparatus For Increasing Potential Payout Opportunities In Card Games," issued Dec. 4, 2012, the content of which is hereby incorporated by reference in its entirety. For example, an indicator may mark card position 910A in a first poker game/hand 912, where the enhanced card provided to that card position 910B when a counter reaches its threshold in the subsequent hand 914 is a Split Card. In this example, the Split Card represents both an Ace of Hearts and a King of Diamonds, thereby providing the player with the benefit of having either or both of those cards at the player's disposal to enhance a result and/or payout for hand 914.

FIG. 9C depicts another example of a card enhancement that may be provided on an eligible subsequent hand. This embodiment represents a Mirror Card embodiment, where a card may be replicated within a hand or to another hand. For example, an enhanced card may be provided to card position 922A of poker hand 920A, which is designated as a Mirror Cards (e.g., a particular card, or provided with some indicia 924 indicating such, etc.). One available result for such a Mirror Card is shown at hand 920B-1, which represents a next stage upon receiving such a Mirror Card at card position 922A. Particularly, hand 920B-1 shows Mirror card 922A being replicated or "mirrored" into another card at an adjacent card position 926. In one embodiment depicted at hand 920B-1, the card that receives the benefit of the mirror card is a card of the same rank but not card suit (e.g. An Ace is mirrored to any other suited Ace). In another example, hand 920B-2 shows Mirror card 922A being replicated into another card at an adjacent card position 928. In this embodiment, the card that receives the benefit of the mirror card is a card of the same rank and suit (e.g. an Ace of Clubs is mirrored to an Ace of Clubs). In another example, hand 920B-3 shows Mirror card 930 being replicated into another card at an adjacent card position 932. In this embodiment, the mirror card may change from the card at the triggering card position 922A of hand 920A, such as changing to a 9 of Hearts at card position 930, while enabling that card to be mirrored into an adjacent card position 932. Again, the examples of FIGS. 9A-9C are provided to show representative enhanced cards, although any other enhanced cards or enhancement techniques may alternatively or additionally be employed.

Figure 10A:
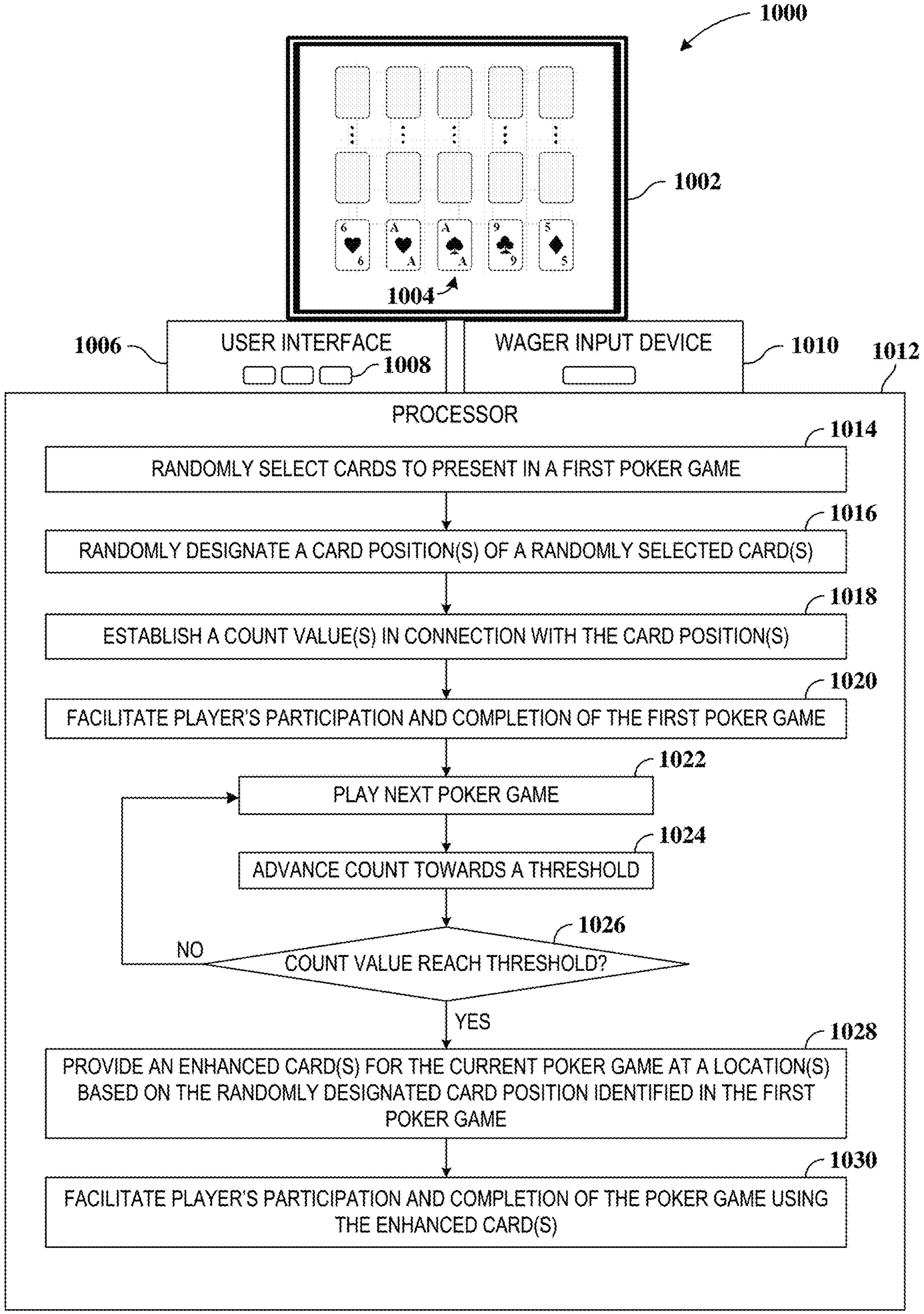
FIGS. 10A and 10B are diagrams of representative gaming apparatuses for enriching subsequent poker hands based on card position designations in prior poker hands and expiration of a count.
Figure 10B:
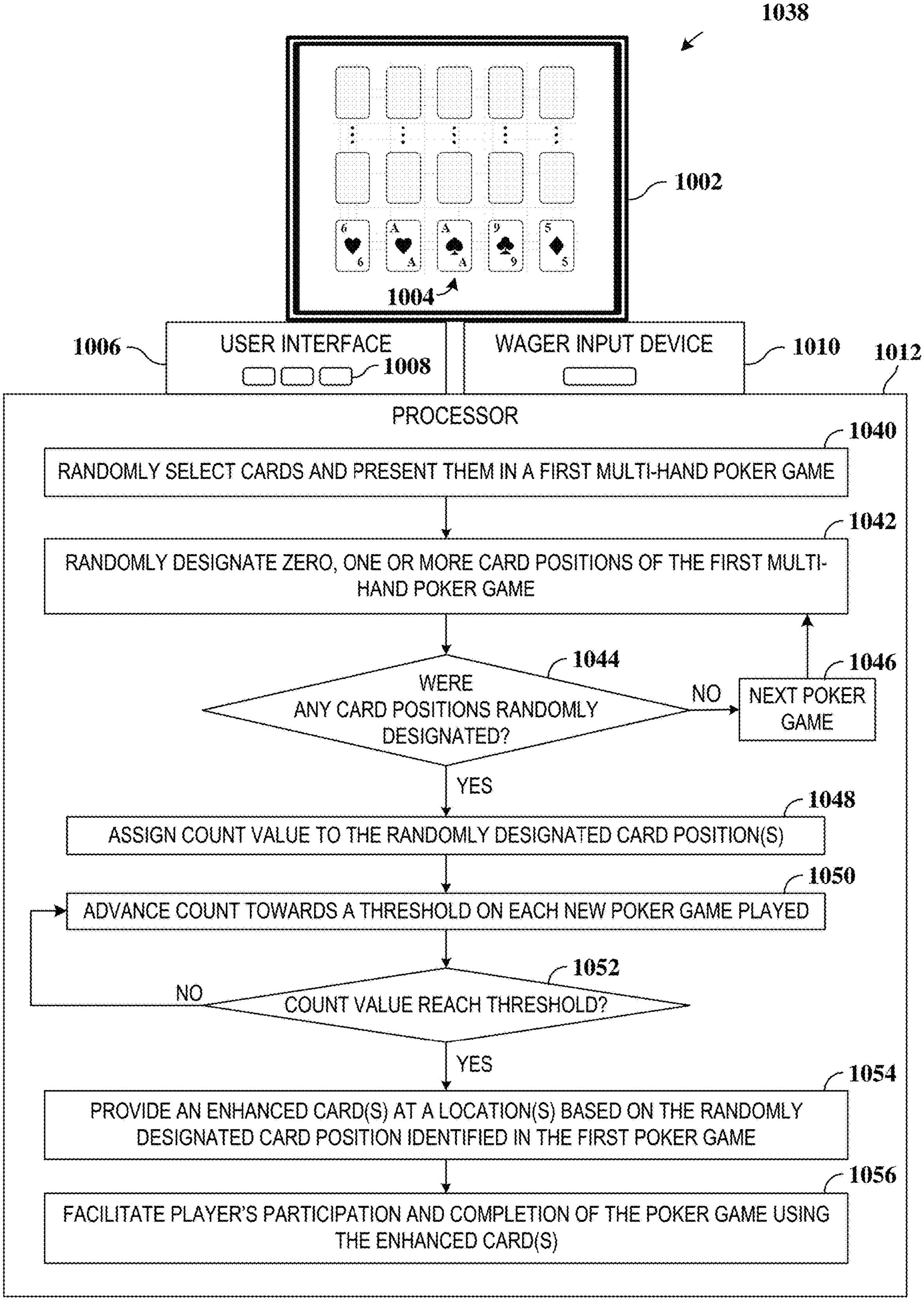

FIGS. 10A and 10B are diagrams of representative gaming apparatuses for enriching subsequent poker hands based on card position designations in prior poker hands. In the embodiment of FIG. 10A, a gaming device 1000 for playing a poker game is provided. The representative gaming device 1000 includes at least a display(s) 1002 presenting a single or multiple poker hands 1004. A user interface 1006 is provided that includes at least one user input 1008 to enable a player to initiate and participate in poker hands 1004 presented via the display 1002. A wager input device 1010 may be provided, which may be structured to identify and validate player assets and ultimately permit the player to play the poker game events when the player assets are provided. For purposes of illustration, FIG. 10A is described in terms of a single-hand poker game, although the principles are equally applicable to multi-hand poker, such as a triple-play poker game or other multi-play poker game, where multiple poker hands are presented to the player at one time, and where cards held in one hand are replicated into all of the other concurrently-played hands.

A processor 1012 is configured to, in one embodiment, to randomly select 1014 cards to present, via the display, in a first poker game. A card position(s) of one of the randomly selected cards of the first poker game is randomly designated 1016 by the processor 1012, such as by visually or otherwise perceptibly setting it apart from other card positions. A count value is established 1018 in connection with the random designation of the card position, such as by assigning a fixed count value, randomly selecting a count value in a pool of available initial count values, or manner of setting an initial value. The processor 1012 is configured to facilitate 1020 the player's completion of the first poker game, and advance 1024 the count value towards a threshold each time another poker game is played 1022. If the count value has not reached the threshold as determined by the processor via block 1026, the next poker game is played 1022, and will continue to advance 1024 the count value towards the threshold each time another poker game is played 1022. When, as determined by the processor via block 1026, the count value has reached the threshold in connection with a poker game, an enhanced card is provided 1028 in the current poker game at a location based on the randomly designated card position identified in the first poker game. The processor facilitates 1030 the player's completion of the current poker games using the enhanced card(s).

In the embodiment of FIG. 10B, a gaming apparatus 1038 for playing a poker game is provided. Utilizing like reference numbers to those of FIG. 10A where applicable, the representative gaming apparatus 1038 includes at least a display(s) 1002 presenting a single or multiple poker hands 1004. A user interface 1006 is provided that includes at least one user input 1008 to enable a player to initiate and participate in poker hands 1004 presented via the display 1002. A wager input device 1010 may be provided, which may be structured to identify and validate player assets and ultimately permit the player to play the poker game events when the player assets are provided.

A processor 1012 is configured to, in one embodiment, randomly select 1040 cards to present in a first multi-hand poker game, where multiple poker hands are concurrently played, and present those cards to the player. The processor 1012 is configured to randomly designate 1042 zero, one or more card positions of the plurality of poker hands of the first multi-hand poker game. If the processor determines via block 1044 that any of the card positions have been designated (e.g. it is not a situation where no counter-type sub-symbol randomly occurred), then count values are assigned 1048 to the randomly designated card positions (otherwise, the player completes the poker game and may choose to move onto the next poker game 1046 where the process of possibly designating a card position(s) may occur).

With a count value assigned 1048 to the randomly designated card position(s), the player can complete the current poker game, and on each new poker game played thereafter, the count value is advanced 1050 towards a threshold. When the processor 1012 determines via block 1052 that the count value has reached the threshold, the processor 1012 provides 1054 and enhanced card(s) at a location(s) based on the randomly designated card position identified in the first poker game, and facilitates 1056 the player's participation and completion of the poker game using the enhanced card(s).

The principles described herein may be applied to other games, such as keno, bingo, etc. For example, in the context of keno, particular number positions (whether associated with positions of the player's identified numbers or not) may be randomly identified with a sub-symbol or otherwise. Upon expiration of a count or other tracking measure as described herein, for the corresponding random selections of numbered keno balls (or other identification of the game play items/numbers), those number positions may be identified as wild to act as if that associated number was one of the random selections, even if it was not. Similar examples apply to bingo, where a bingo card position may be marked, and later bingo games treat the marked position as a free space (similar to the middle position in many bingo games) when a counter or other tracking measure reaches the threshold. These and other applications of the enhancement features described herein may be employed.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention covers alternatives, modifications, and equivalents that come within the scope and spirit of the principles set out herein and/or in the appended claims.

What is claimed is:

1. A method of operating a gaming apparatus for facilitating player participation in poker games, the gaming apparatus including a display, a user interface configured to receive at least player input to facilitate player participation in the poker game, a wager input device structured to identify and validate player assets and to permit the player to participate in the poker games in which the player assets are provided, and a processor, the method comprising:

randomly selecting cards to present in a first poker game via the display;

randomly designating a card position of one of the randomly selected cards of the first poker game;

establishing a count value in connection with the random designation of the card position;

facilitating the player's completion of participation of the first poker game;

advancing the count value towards a threshold each time another of the poker games is played;

when a particular one of the poker games is reached where the count value reaches the threshold, providing an enhanced card in the particular one of the poker games at a location based on the randomly designated card position identified in the first poker game; and facilitating the player's completion of the particular one of the poker games using the enhanced card.

2. The method of claim 1, wherein the enhanced card in the particular one of the poker games is provided at the randomly designated card position identified in the first poker game.

3. The method of claim 1, wherein the enhanced card in the particular one of the poker games is provided at card positions adjacent to the randomly designated card position identified in the first poker game.

4. The method of claim 1, the enhanced card in the particular one of the poker games is provided at card positions occupied by randomly-occurring indicia in the particular one of the poker games.

5. The method of claim 4, wherein the randomly-occurring indicia includes additional randomly designated card positions having associated ones of the established count values.

6. The method of claim 1, wherein the enhanced card in the particular one of the poker games is provided at card positions occupied by randomly-occurring indicia in the particular one of the poker games and adjacent to the randomly designated card position identified in the first poker game.

7. The method of claim 1, the enhanced card in the particular one of the poker games is provided at card positions occupied by dealt cards having certain card characteristics.

8. The method of claim 1, wherein the poker games comprise single-hand poker games.

9. The method of claim 1, wherein the poker games comprise multi-hand poker games comprising a plurality of poker hands.

10. The method of claim 9, wherein the multi-hand poker games involve multi-play poker games where the cards held for one of the plurality of poker hands are replicated into remaining ones of the plurality of poker hands, and the cards that were not held or replicated are discarded in favor of replacement cards.

11. The method of claim 1, further comprising:

randomly designating a second card position of one of the randomly selected cards of any of the poker games played;

establishing a second count value in connection with the random designation of the second card position;

facilitating the player's completion of the poker game in which the second card position was randomly designated;

advancing the second count value towards a second threshold each time another of the poker games is played;

when a second particular one of the poker games is reached where the second count value reaches the second threshold, providing a second enhanced card in the second particular one of the poker games at the randomly designated second card position identified in the poker game in which the second card position was randomly designated; and facilitating the player's completion of the second particular one of the poker games using the second enhanced card.

12. The method of claim 11, further comprising:

randomly designating an Nth card position of one of the randomly selected cards of any of the poker games played;

establishing an Nth count value in connection with the random designation of the Nth card position;

facilitating the player's completion of the poker game in which the Nth card position was randomly designated;

advancing the Nth count value towards an Nth threshold each time another of the poker games is played;

when an Nth particular one of the poker games is reached where the Nth count value reaches the Nth threshold, providing an Nth enhanced card in the Nth particular one of the poker games at the randomly designated Nth card position identified in the poker game in which the Nth card position was randomly designated; and facilitating the player's completion of the Nth particular one of the poker games using the Nth enhanced card.

13. The method of claim 12, wherein the enhanced card, the second enhanced card, and the Nth enhanced card are the same.

14. The method of claim 12, wherein the enhanced card, the second enhanced card, and the Nth enhanced card are Wild cards.

15. The method of claim 12, wherein one or more of the enhanced card, the second enhanced card, and the Nth enhanced card are different from one another.

16. The method of claim 1, wherein any of the randomly designated card position, the randomly designated second card position, and the randomly designated Nth card position for their respective ones of the poker games may be at a same one of the card positions or at different ones of the card positions.

17. A method of operating a gaming apparatus for facilitating player participation in poker games, the gaming apparatus including a display, a user interface configured to receive at least player input to facilitate player participation in the poker game, a wager input device structured to identify and validate player assets and to permit the player to participate in the poker games in which the player assets are provided, and a processor, the method comprising:

randomly selecting cards to present in a first multi-hand poker game where a plurality of poker hands are concurrently played, and present the randomly selected cards via the display;

randomly designating zero, one or more card positions of the plurality of poker hands of the first multi-hand poker game;

if any of the card positions of the plurality of poker hands of the first multi-hand poker game was randomly selected, assigning count values thereto, wherein the count values are displayed on the display in connection with the respective selected card positions;

advancing the count values towards a threshold on each of the multi-hand poker games played, wherein the displayed count values associated with the respective selected card positions are updated to reflect the advance in the count values;

determining when any of the count values reach the threshold; and in response to any of the count values reaching the threshold, providing an enhanced card at a location based on the randomly designated card position of the first multi-hand poker game, and facilitating completion of the multi-hand poker game in which the count value reached the threshold using the enhanced card.

18. The method of claim 17, wherein the count values are assigned by randomly selecting a count value from a plurality of available count values.

19. The method of claim 17, wherein the count values are assigned a predetermined fixed count value.

20. The method of claim 17, wherein the count values are advanced towards their respective thresholds by a count of one on each of the multi-hand poker games played.

* * * * *